United States Patent
Balachandran et al.

(10) Patent No.: US 9,755,726 B2
(45) Date of Patent: Sep. 5, 2017

(54) METHOD AND APPARATUS FOR IMPROVED MULTI-CARRIER COMMUNICATION

(71) Applicant: Alcatel Lucent, Boulogne-Billancourt (FR)

(72) Inventors: Krishna Balachandran, Morganville, NJ (US); Joseph H. Kang, Belle Mead, NJ (US); Kemal M. Karakayali, Highland Park, NJ (US); Kiran M. Rege, Marlboro, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 44 days.

(21) Appl. No.: 14/257,672

(22) Filed: Apr. 21, 2014

(65) Prior Publication Data

US 2015/0305034 A1 Oct. 22, 2015

(51) Int. Cl.
*H04B 7/155* (2006.01)
*H04W 72/04* (2009.01)
(Continued)

(52) U.S. Cl.
CPC ......... *H04B 7/15521* (2013.01); *H04L 5/001* (2013.01); *H04W 72/042* (2013.01); *H04W 76/00* (2013.01); *H04W 80/02* (2013.01)

(58) Field of Classification Search
CPC ............. H04W 72/0453; H04W 80/02; H04W 72/042; H04W 72/0406; H04B 7/15521
See application file for complete search history.

(56) References Cited

U.S. PATENT DOCUMENTS

2009/0238142 A1* 9/2009 Chun .................... H04W 28/06
370/331

2014/0056243 A1* 2/2014 Pelletier ................ H04W 74/04
370/329
(Continued)

FOREIGN PATENT DOCUMENTS

| WO | WO-2011/100492 A1 | 8/2011 |
| WO | WO-2012/064772 A1 | 5/2012 |
| WO | WO-2013/104413 A1 | 7/2013 |

OTHER PUBLICATIONS

NTT Docomo et al: "Discussion on U-plane architecture for dual connectivity" 3GPP Draft; R2-131120 Discussion on U-Plane Achitecture for Dual Connectivity, 3rd Generation Partnership Project (3GPP), Mobile Competence Centre; 650, Route Des Lucioles; F-06921 Sophia-Antipolis, vol. RAN WG@, no. Chicago, USA; 20130414-20130419, Apr. 6, 2013 (Apr. 6, 2013).
(Continued)

*Primary Examiner* — Pao Sinkantarakorn
*Assistant Examiner* — Kabir Jahangir
(74) *Attorney, Agent, or Firm* — Harness, Dickey & Pierce, P.L.C.

(57) ABSTRACT

Various methods and apparatuses are provided to address the need for improved multi-carrier communication. In one apparatus, a radio access network (RAN) (402) includes multiple network nodes (403, 406) operative to transmit, via multiple carriers (411-412), packet data to a user element (UE) (401) using a protocol stack. The protocol stack includes a radio link control (RLC) layer split into an upper RLC processing layer and multiple lower RLC processing layers. Each lower RLC processing layer is associated with one carrier of the multiple carriers and each lower RLC processing layer supports packet data transmission via its associated carrier. The upper RLC processing layer supports packet data transmission via the multiple carriers.

20 Claims, 4 Drawing Sheets

(51) Int. Cl.
*H04W 80/02* (2009.01)
*H04W 76/00* (2009.01)
*H04L 5/00* (2006.01)

(56) References Cited

U.S. PATENT DOCUMENTS

| 2014/0198716 | A1* | 7/2014 | Speight | H04W 72/0413 |
| | | | | 370/315 |
| 2015/0181593 | A1* | 6/2015 | Kim | H04W 52/0216 |
| | | | | 370/329 |
| 2015/0244429 | A1* | 8/2015 | Zhang | H04B 7/024 |
| | | | | 370/329 |
| 2016/0066362 | A1* | 3/2016 | Ohta | H04W 16/32 |
| | | | | 370/331 |
| 2016/0212661 | A1* | 7/2016 | Basu Mallick | H04L 1/1614 |
| 2016/0338138 | A1* | 11/2016 | Pelletier | H04W 76/046 |

OTHER PUBLICATIONS

Interdigital Communications: "User Plane Achitecture for Dual-Connectivity", 3GPP Draft ; R2-131939 User Plane Architecture for Dual Connectivity, 3rd Generation Partnership Project (3GPP), Mobile Competence Centre; 650, Route Des Iucioles; F-06921 Sophia-Antipolis Cedex; FR vol. Ran WG2, no. Fukuoka, Japan; 20130520-20130524, May 11, 2013 (May 11, 2013).
International Search Report and Written Opinion dated Jul. 3, 2015.

\* cited by examiner

METHOD AND APPARATUS FOR IMPROVED MULTI-CARRIER COMMUNICATION

FIELD OF THE INVENTION

The present invention relates generally to communications and, in particular, to multi-carrier communication in wireless systems.

BACKGROUND OF THE INVENTION

This section introduces aspects that may help facilitate a better understanding of the inventions. Accordingly, the statements of this section are to be read in this light and are not to be understood as admissions about what is prior art or what is not prior art.

Carrier aggregation allows a radio bearer (i.e., a logical connection with certain features between a cellular network and a mobile station) to benefit from concurrent transmission over multiple carriers, thereby significantly increasing the bit-rates carrying data associated with different user applications. However, carrier aggregation can be implemented only if the two (or more) carriers that are being aggregated are co-located and there is tight coordination among them. The Seamless Macro-cell Anchored Radio Transmission (SMART) technique (also known as Dual Connectivity) enables a mobile station to have multiple, parallel links to different nodes in the cellular network. However, since these nodes and the corresponding carriers are not co-located or cannot be tightly coordinated, one cannot implement carrier aggregation to enable individual radio bearers in a SMART network to benefit from concurrent transmission over multiple carriers. Thus, new solutions and techniques that enable such functionality would meet a need and advance wireless communications generally.

Figure 1:
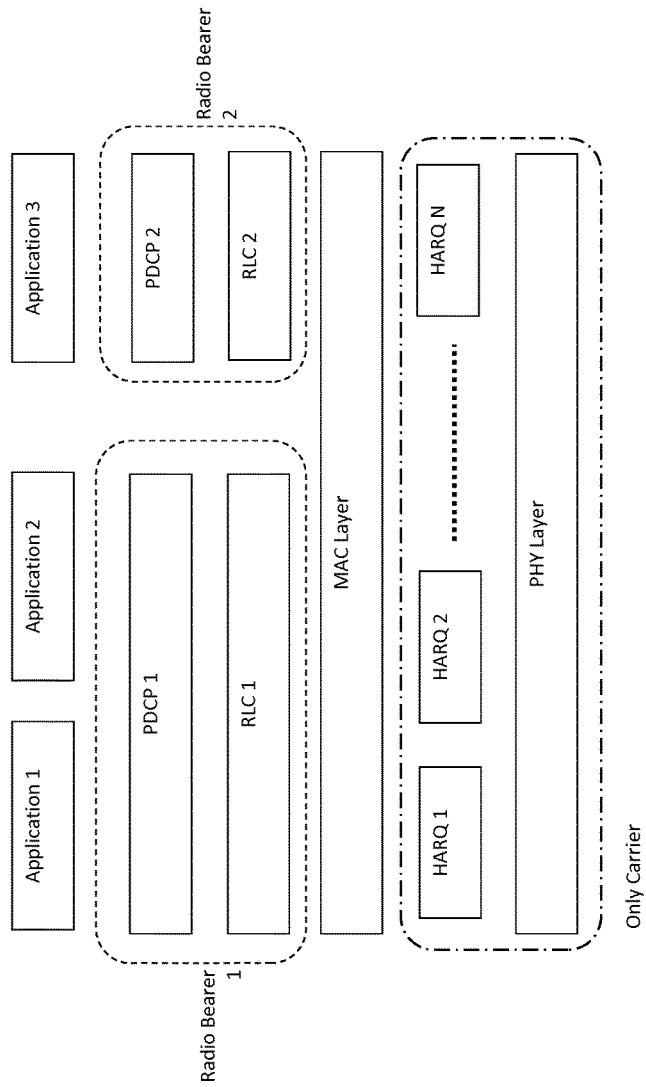
FIG. 1 is a block diagram depiction of a single carrier 3GPP Long Term Evolution (LTE) user plane protocol stack.

Specific embodiments of the present invention are disclosed below with reference to FIGS. 1-4. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

SUMMARY

Various methods and apparatuses are provided to address the need for improved multi-carrier communication. In one method, a radio access network (RAN) transmits via multiple carriers, packet data to a user element (UE) using a protocol stack. The protocol stack includes a radio link control (RLC) layer split into an upper RLC processing layer and multiple lower RLC processing layers. Each lower RLC processing layer is associated with one carrier of the multiple carriers. The upper RLC processing layer supports packet data transmission via the multiple carriers, while each lower RLC processing layer supports packet data transmission via the carrier associated with that lower RLC processing layer. An article of manufacture is also provided, the article comprising a non-transitory, processor-readable storage medium storing one or more software programs which when executed by one or more processors performs the steps of this method.

Many embodiments are provided in which the method above is modified. For example, in many embodiments supporting, by the upper RLC processing layer, packet data transmission via the multiple carriers involves the upper RLC processing layer receiving RLC service data units (SDUs), generating protocol data units (PDUs) from the SDUs received, and sending PDUs to each of the lower RLC processing layers. Depending on the embodiment, supporting, by the upper RLC processing layer, packet data transmission via the multiple carriers may also involve the upper RLC processing layer receiving an indication of a PDU size limit from at least one of the multiple lower RLC processing layers and may further involve the upper RLC processing layer generating PDUs with this PDU size limit.

In many embodiments, supporting, by each lower RLC processing layer, packet data transmission via the carrier associated with that lower RLC processing layer involves each lower RLC processing layer receiving PDUs from the upper RLC processing layer and processing the PDUs from the upper RLC processing layer as data to be retransmitted. This processing by each lower RLC processing layer may involve segmenting the PDUs from the upper RLC processing layer to conform to a local current size limit at that lower RLC processing layer. In many embodiments, supporting, by each lower RLC processing layer, packet data transmission via the carrier associated with that lower RLC processing layer involves each lower RLC processing layer performing RLC Segmentation processing.

In some embodiments, the RAN includes a group of cells, some of which are geographically separated. Individual lower RLC processing layers of the multiple lower RLC processing layers may each operate on the network equipment of each of these different cells.

A radio access network (RAN) apparatus is also provided. The RAN including multiple network nodes operative to transmit, via multiple carriers, packet data to a user element (UE) using a protocol stack. The protocol stack includes a radio link control (RLC) layer split into an upper RLC processing layer and multiple lower RLC processing layers. Each lower RLC processing layer is associated with one carrier of the multiple carriers and each lower RLC processing layer supports packet data transmission via its associated carrier. The upper RLC processing layer supports packet data transmission via the multiple carriers.

Many embodiments are provided in which this RAN is modified. In many embodiments, a first network node of the multiple network nodes is operative to host the upper RLC processing layer, which involves being operative to receive RLC service data units (SDUs), to generate protocol data units (PDUs) from the SDUs received, and to send PDUs to each of the lower RLC processing layers. Depending on the embodiment, being operative to host the upper RLC processing layer may also involve being operative to receive from at least one of the multiple lower RLC processing layers, an indication of a PDU size limit and may further involve being operative to generate PDUs with this PDU size limit.

In many embodiments, a second network node of the multiple network nodes is operative to host a lower RLC processing layer of the multiple lower RLC processing layers, which involves being operative to receive PDUs from the upper RLC processing layer and to process the PDUs from the upper RLC processing layer as data to be retransmitted. This processing may involve being operative to segment the PDUs from the upper RLC processing layer to conform to a local current size limit at the lower RLC processing layer. In many embodiments, a second network node of the multiple network nodes is operative to host a lower RLC processing layer of the multiple lower RLC processing layers, which involves being operative to perform RLC Segmentation processing.

In some embodiments, a first network node of the multiple network nodes is operative to host the upper RLC processing layer, and a second, different network node of the multiple network nodes is operative to host a lower RLC processing layer of the multiple lower RLC processing layers. Depending on the embodiment, the first network node and the second network node may be geographically separated.

DETAILED DESCRIPTION OF EMBODIMENTS

Figure 2:
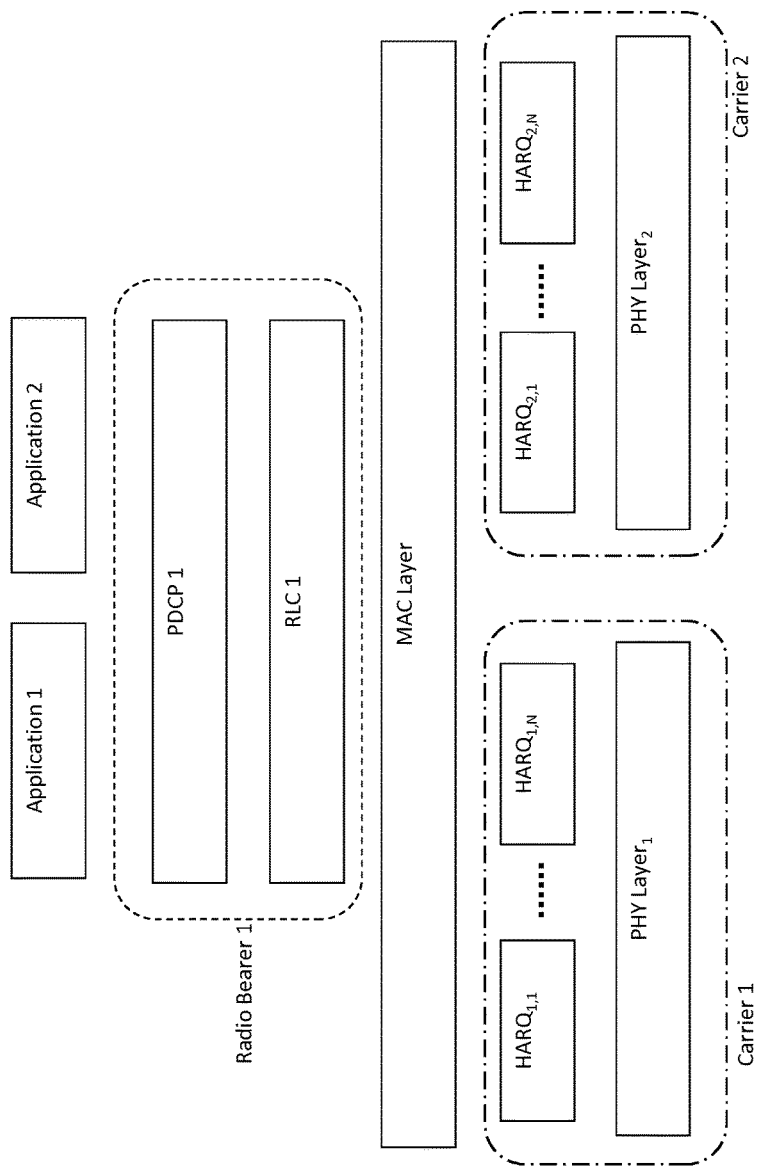
FIG. 2 is a block diagram depiction of a protocol stack for a radio bearer using carrier aggregation.
Figure 3:
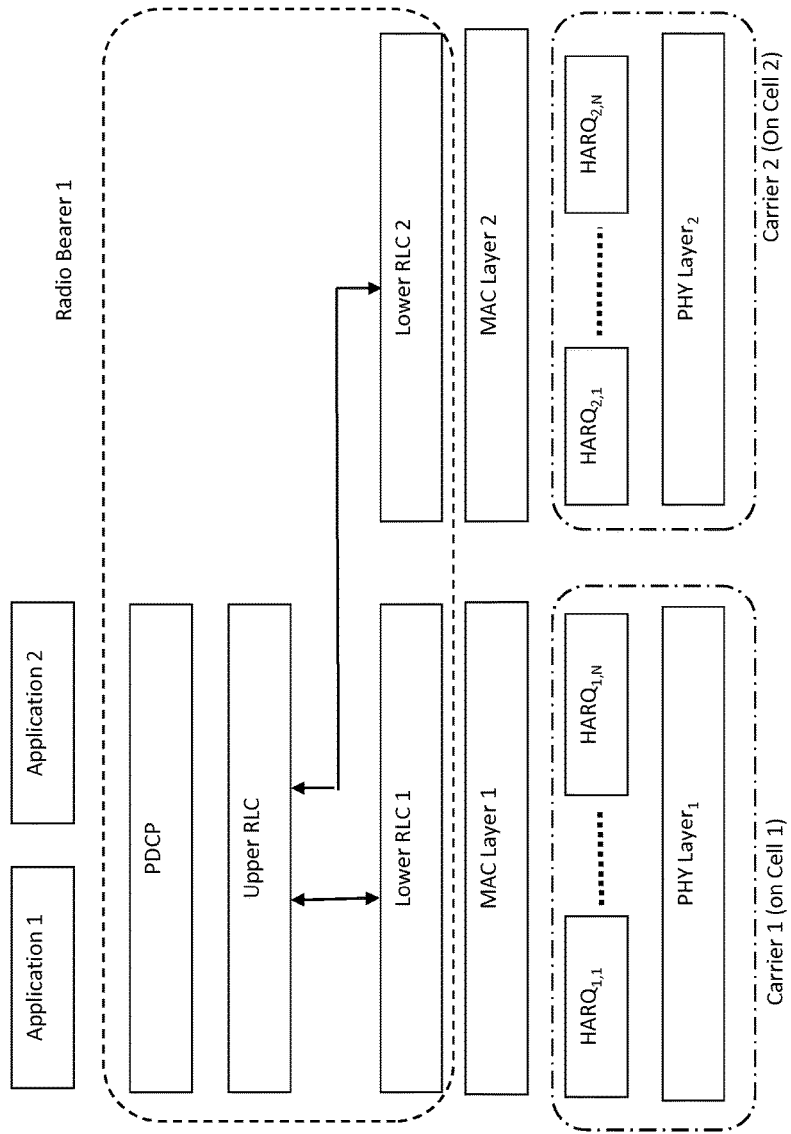
FIG. 3 is a block diagram depiction of a protocol stack with a split Radio Link Control (RLC) layer as applied to an embodiment involving the transmission by two different cells over dedicated carriers.

To provide a greater degree of detail in making and using various aspects of the present invention, a description of our approach to multi-carrier communication and a description of certain, quite specific, embodiments follow for the sake of example. FIGS. 1-3 are referenced in an attempt to illustrate some examples of specific protocol stacks and specific embodiments of the present invention.

Carrier aggregation is a transmission technique that has been designed to enable data flows to benefit from simultaneous transmission over multiple carriers. For communication systems based on the 3GPP Long Term Evolution (LTE) family of standards, carrier aggregation has been defined in Release 10 of the 3GPP standards.

In 3GPP LTE systems, packet flows associated with different applications are carried over one or more radio bearers. A radio bearer is a logical connection between a User Element (UE) and the Radio Access Network (RAN) with certain quality features (e.g. packet loss, delay, and/or rate requirements.) Packets belonging to a given user application are typically carried over a single radio bearer, which may carry packets belonging to other user applications as well. FIG. 1 depicts a protocol stack 100 for the user plane in LTE systems without carrier aggregation.

As shown in FIG. 1, in single-carrier communication systems based on the 3GPP LTE standards, there is one Packet Data Convergence Protocol (PDCP) entity and one Radio Link Control (RLC) layer entity per radio bearer. On the other hand, a common Medium Access Control (MAC) layer supports all of the radio bearers being carried over the air interface associated with the carrier.

Most relevant to the present description are the functions of the RLC and MAC layers of the protocol stack. The major functions of the RLC layer are segmentation and (re)assembly of upper layer packets (referred to as RLC Service Data Units or RLC SDUs) to adapt them to the size indicated by the lower (MAC) layer based on the current channel and traffic conditions. Also, for radio bearers requiring error-free transmission, i.e. Acknowledged Mode (AM) data, the RLC layer provides re-transmission of errored frames based on receiver feedback. The RLC layer (at the receiving end) also performs reordering of received packets in case they are delivered out of sequence because of delays/retransmissions in the lower layers. The MAC layer is mainly responsible for multiplexing data from different radio bearers (i.e. different RLC entities) based on their Quality of Service (QoS) requirements. As mentioned before, there is a single MAC layer entity that handles data associated with all of the radio bearers being carried over the air interface associated with the transmission point (i.e., a base station or a UE.) The MAC layer uses the communication resources (represented by the physical—PHY—layer of protocol stack 100) to transmit RLC-layer data over the air interface. It uses the Hybrid Automatic Repeat request (HARQ) processes to keep track of transmitted data, the corresponding acknowledgements, and retransmissions if necessary.

With carrier aggregation, which is intended for scenarios where a base station supports multiple carriers to transmit data to UEs communicating with it, the protocol stack looks similar to that of FIG. 1 except that the common MAC layer is responsible for multiplexing the data from different radio bearers so that it can be transmitted using the communication resources associated with the multiple carriers being supported by the transmission point (e.g., a base station). Thus, in the case of a system with two carriers, carrier aggregation makes it possible for some of the data from a given radio bearer to be carried over the communication resources associated with the first carrier while the rest of the data associated with that radio bearer is carried over the second carrier. This would lead to a significant increase in transmission speeds for UEs and base stations capable of carrier aggregation. FIG. 2 depicts a protocol stack 200 that is able to support a radio bearer whose data is carried over the communication resources of two carriers.

The main difference between the protocol stack for a radio bearer using carrier aggregation (protocol stack 200) and that for a radio bearer in single-carrier operation (protocol stack 100) is that the MAC layer in the former can use communication resources and HARQ processes associated with both of the carriers to transmit data belonging to the radio bearer. (In contrast, the MAC layer in single-carrier operation uses communication resources and HARQ processes associated with a single carrier.) Thus, in the case of a radio bearer using carrier aggregation (e.g., Radio Bearer 1 of protocol stack 200), when communication resources on either of the two carriers are available for the transmission of data belonging to that radio bearer, the MAC layer informs the corresponding RLC entity of the payload size that can be handled based on the current channel and load conditions. The RLC entity then constructs a payload (a protocol data unit or PDU) up to that size and hands it to the MAC layer for transmission over the air interfaces. As mentioned earlier, in the case of AM data, if an RLC PDU gets lost and the receiver informs the transmission point of its loss, the RLC layer re-transmits this lost data. However, since the amount of communication resources available for the re-transmission of this lost data can be different from what was available when the data was originally transmitted, the RLC layer is equipped with Segmentation and Re-Assembly (SAR) capability, which allows it to construct different sized PDUs from the original ones (which were lost) and then reconstruct the original PDUs from these segments at the receiver end. The RLC layer has this SAR capability whether or not carrier aggregation is being used.

The carrier aggregation scheme represented by protocol stack 200 works well in scenarios where the two (or more) carriers are co-located and operate under the control of common MAC and RLC layer entities. A key requirement for this to be possible is that the latencies between the PHY, MAC and RLC layers be low—on the order of a millisecond or lower. However, there are several scenarios where carrier-aggregation-like multi-carrier transmission to UEs may be desirable, yet the two carriers may not be co-located, or tight, low-latency coordination may not be possible between their respective PHY layers and the upper layer entities. An example of such a scenario in Heterogeneous Networks (Hetnets) is the Seamless Macro-cell Anchored Radio Transmission (SMART) technique which allows a UE to have a primary connection to one cell (typically a macro-cell) and secondary connections to one or more macro or metro cells. The primary connection ensures that Radio Resource Control (RRC) is always maintained with an "anchor" transmission point while secondary connections are dynamically added or dropped at much faster time scales to provide opportunistic access for data traffic associated with a radio bearer. This technique is different from soft handoff techniques in cdma2000 or WCDMA and also different from joint transmission techniques being considered as part of Coordinated Multipoint (CoMP) techniques in 3GPP Long Term Evolution (LTE/LTE-Advanced), since it allows different streams of data to be transmitted across the primary and secondary links. The links may be established on the same carrier or over multiple carriers if carrier aggregation is supported by the UE. Studies have shown that performance benefits of this technique can be quite significant, both from the perspective of improving cell-edge throughput as well as reducing handover failures. The SMART technique is also known by the name "Dual Connectivity" and is being taken up for standardization by 3GPP.

In a SMART or Dual Connectivity system, a UE will be able to communicate concurrently with one or more transmitting and receiving endpoints within the cellular network over multiple sets of resources (i.e., dedicated carriers or alternative time/frequency resource partitions). However, these transmitting and receiving nodes may not be co-located, or the messaging between them may experience significant latencies (of the order of tens of milliseconds or more). In such cases, the communication scheme represented by protocol stack 200 cannot work as desired (since the basic requirement of low latencies between the PHY, MAC and RLC layers will be violated). Thus, we need to make changes to protocol stack 200 in order to enable radio bearers to take advantage of concurrent transmissions over multiple carriers or other time/frequency resource partitions if their respective end-points on the network side have significant latencies between them.

In current networks based on LTE/LTE-A (including those that support carrier aggregation), where a UE is associated with one serving cell, the protocol layers shown in FIG. 1 or 2 are implemented at the serving base station. However, reliable transmission of data associated with a single radio bearer over multiple cells (e.g., in a SMART or Dual Connectivity network) requires some changes to the protocol stack at the network and/or the UE. As we saw before, the use of a common RLC layer followed by splitting of data streams at lower layers (e.g., MAC/PHY) requires low latency backhaul connections between the primary serving cell and secondary serving cell. Such an arrangement is not possible because of the geographical separation between the primary cell and secondary cell(s) in a SMART network. It is possible to split the data streams at the PDCP layer and have independent instances of RLC, MAC and PHY layers over the primary and secondary links. However, the need for reliable in-sequence delivery of upper layer data will necessitate another layer with retransmission capability at PDCP, particularly since secondary links may degrade or drop quite easily for mobile UEs. This can introduce additional inefficiencies and delay.

To address these challenges, a split Radio Link Control (RLC) solution is proposed for reliable in-sequence data delivery for a single radio bearer split over multiple spatially separated or co-located transmission points when the interconnecting backhaul network does not necessarily support very low latencies. To simplify the description, we assume that a UE has established a primary connection (or link) and one or more secondary connections (or links). The methods used to establish these links may be based on radio measurements, loads, or other factors and are outside the scope of this description. We also assume that feedback associated with downlink operation on one or more links can be made available via the uplink. The procedures for uplink feedback reporting are also outside the scope of this description.

The focus here is on downlink transmissions of Acknowledged Mode (AM) data. In an embodiment of our approach, the data associated with an AM radio bearer is simultaneously delivered over a primary and one or more secondary links. Only one PDCP protocol instance is assumed in this case but the RLC protocol functions are split across upper and lower RLC instances as depicted by protocol stack 300 of FIG. 3. Note that the RLC layer used currently in cellular systems such as LTE supports many functions such as the transfer of upper layer Protocol Data Units (PDUs), concatenation or segmentation of these PDUs based on allowable size of RLC PDUs indicated by the lower layer at each transmission opportunity, an Automatic Repeat Request (ARQ) retransmission mechanism for reliable in-sequence delivery, re-segmentation of RLC data PDUs for retransmissions in acknowledged mode and reassembly of the RLC SDUs at the receiver for delivery to upper layers. Since the RLC PDU sizes are chosen based on scheduling decisions made at lower layers, this approach is not well suited to an architecture where the RLC data is split over two or more links, each of which may be scheduled independently at a different geographic site. In particular, the latency on the backhaul network will typically not be low enough to allow the RLC layer to quickly adapt to lower layer scheduling (per 1 ms subframe or Transmission Time Interval (TTI) in the case of LTE).

The split RLC approach that we are proposing is able to accommodate data transmission over two or more links from geographically separated sites while allowing for higher backhaul latencies. In this case, we create only one upper RLC instance for each radio bearer but allow multiple lower RLC instances to be established, one for each radio link. The main aspects of the split RLC operation are as follows:

Upper RLC Operation (Transmitting side): The upper RLC entity receives RLC SDUs from the upper layer (PDCP PDUs in the case of LTE). It then generates RLC PDUs with pre-determined size limits by appending headers containing a sequence number for each PDU and forwards RLC PDUs down to the lower RLC instances at the primary and/or secondary transmission points for delivery to the receiving peer RLC entity (i.e., at the UE). RLC SDUs of variable sizes are supported and may be concatenated or segmented in order to generate data units accommodated within each PDU. These concatenation/segmentation procedures and headers assumed may be similar to those specified in LTE. The upper RLC instance may be established at the primary serving base station or any other node deemed suitable. The upper RLC layer is also responsible for retransmitting RLC layer data that may have been lost or delayed in transit to the UE. The Automatic Repeat request (ARQ) operation used by the upper RLC layer to support this functionality may be identical to the one used by the RLC layer in the current 3GPP LTE protocol stack (e.g., those of FIGS. 1 and 2). As in the current implementations of RLC, the upper RLC layer may receive a status report from the receiving side, and if the report indicates the loss of one or more RLC PDUs, the upper RLC layer may decide to retransmit the lost RLC PDUs. It may carry out this retransmission by handing copies of the lost RLC PDUs to the lower RLC layer entities residing in either the primary transmission point or the secondary transmission point. Note that the RLC entities in the current LTE protocol stack keep copies of RLC PDUs until they are acknowledged (or until they have to be discarded because of repeated failures in delivery). These copies are used during retransmissions. The upper RLC layer in the proposed split RLC operation merely emulates this behavior. Note also that the RLC PDUs whose copies are kept by the upper RLC layer are identical those that are handed by the upper RLC layer to the lower RLC entities. The upper RLC layer is completely oblivious of the further processing, such as possible segmentation that occurs at the lower RLC layer. In summary, the upper RLC layer in the proposed split RLC operation supports the entire functionality of an AM RLC entity in the current LTE protocol stack except segmentation.

Lower RLC Operation (Transmitting side): RLC PDUs received by each lower RLC entity are buffered while waiting for transmission opportunities indicated by the lower layers. Flow control is assumed between the upper and lower RLC entities to ensure that there is no buffer starvation or overflow at the lower RLC entities. When a transmission opportunity that can accommodate a certain size (in number of bytes or bits) is indicated by the lower layer, a lower RLC entity does the following: If the size of an RLC PDU is less than or equal to the size that can be accommodated by the lower protocol layer, the RLC PDU is handed "as is" to the lower protocol layer. If, on the other hand the RLC PDU is larger than the size that can be handled by the lower protocol layer, it is segmented to form smaller size RLC PDU segments to conform to the size indicated by the lower protocol layer. These RLC PDU segments are then handed to the lower protocol layer for transmission. This processing of RLC PDUs by the lower RLC entity is similar to the handling of retransmissions (by the RLC layer) in the LTE specifications. Thus, effectively, even the first transmission of an RLC PDU (by the lower RLC Layer) is treated like a retransmission and relevant headers indicating segment boundaries are included. From the UE's perspective, the situation is similar to what would happen in the current LTE protocol if there was an initial transmission of the RLC PDUs with sizes and boundaries consistent with those of the RLC PDUs handed down by the upper RLC, and, somehow, these PDUs got lost; and the lower RLC is merely retransmitting these PDUs by possibly re-segmenting them into new sizes per the local current size limit (e.g., as determined by changed channel/load conditions). Since lower layers (MAC and PHY) responsible for scheduling decisions are assumed to be co-located with the lower RLC layer, this approach accommodates efficient, dynamic scheduling decisions that can take the prevailing load and channel conditions into account. In short, the lower RLC layer merely embodies the SAR functionality of the RLC layer in the current LTE protocol stack. (Strictly speaking, this is only the "segmentation" part of the SAR functionality, since the transmitting end does segmentation while the receiving end does re-assembly.)

Receiving RLC Operation: Procedures followed by the receiving RLC entity can be identical to those followed by the UE in the single link case. The receiving side RLC entity will maintain a receive window and only accept PDUs or PDU segments only if the sequence number falls within the window. It also any discards duplicates, reorders and reassembles segments into PDUs, and finally PDUs into RLC SDUs that are delivered in sequence to the upper layer. Since the receiving RLC operation based on protocol stack 200 has this capability, no change would be required on the receiver side to implement the overall multi-carrier communication scheme.

The split-RLC scheme described above would enable AM radio bearers to benefit from simultaneous transmission from multiple cells in a manner analogous to radio bearers benefiting from carrier aggregation. At the same time, it involves minimal changes to the existing LTE protocol stack, particularly from the viewpoint of a UE. A few minor variations of this scheme are possible, which are completely consistent with the spirit of this approach.

For instance, it has been stated that the upper RLC layer hands down RLC PDUs with pre-determined size limits. These pre-determined size limits can be quasi-statically changed based on information provided periodically by the lower RLC entities. Thus, each RLC entity can periodically send a message to the upper RLC entity indicating the desired RLC PDU size based on prevailing channel and load conditions at its end, and the upper RLC entity can use the latest such information to construct RLC PDUs that it sends to the corresponding lower RLC entity. In those cases where the lower and upper RLC entities for a given radio bearer are co-located, this messaging (from the lower to the upper RLC entity) can take place frequently; moreover, since the latencies in such cases are small, the upper RLC would be able to construct RLC PDUs that are appropriate for the current channel and load conditions, thus eliminating the need for further re-segmentation by the lower RLC entity.

In addition, the PDU size limit specified by the lower RLC will allow the upper RLC to pick any PDU sizes that are smaller. However, it is possible that the upper RLC ends up picking PDU sizes that are too small (despite having a data backlog). The upper RLC could be driven to pick higher PDU sizes by having the lower RLC indicate an optional preferred minimum PDU size. The upper RLC would then typically pick a size between the preferred minimum and the PDU size limit. However, if there is an insufficient data backlog to satisfy the preferred minimum size, then it could pick a size that is lower than the preferred minimum size. The advantage of picking a higher size when there is sufficient data backlog is that it reduces RLC overhead (since headers are added for every PDU).

Again, the basic idea of this approach is to split the functionality of the RLC layer in the protocol stack controlling the communication between the cellular network and the mobile station. This splitting of the RLC layer enables the data associated with a radio bearer to be carried concurrently over multiple carriers. The RLC layer in the mobile station is able to collect this data and hand it "in-sequence" to the higher protocol layers without changes to current mobile-side operation. Thus, this split RLC technique enables radio bearers in a SMART or Dual Connectivity network to enjoy the benefits of concurrent transmission over multiple carriers similar to what carrier aggregation provides.

The detailed and, at times, very specific description above is provided to effectively enable a person of skill in the art to make, use, and best practice the present invention in view of what is already known in the art. In the examples, specifics are provided for the purpose of illustrating possible embodiments of the present invention and should not be interpreted as restricting or limiting the scope of the broader inventive concepts.

Figure 4:
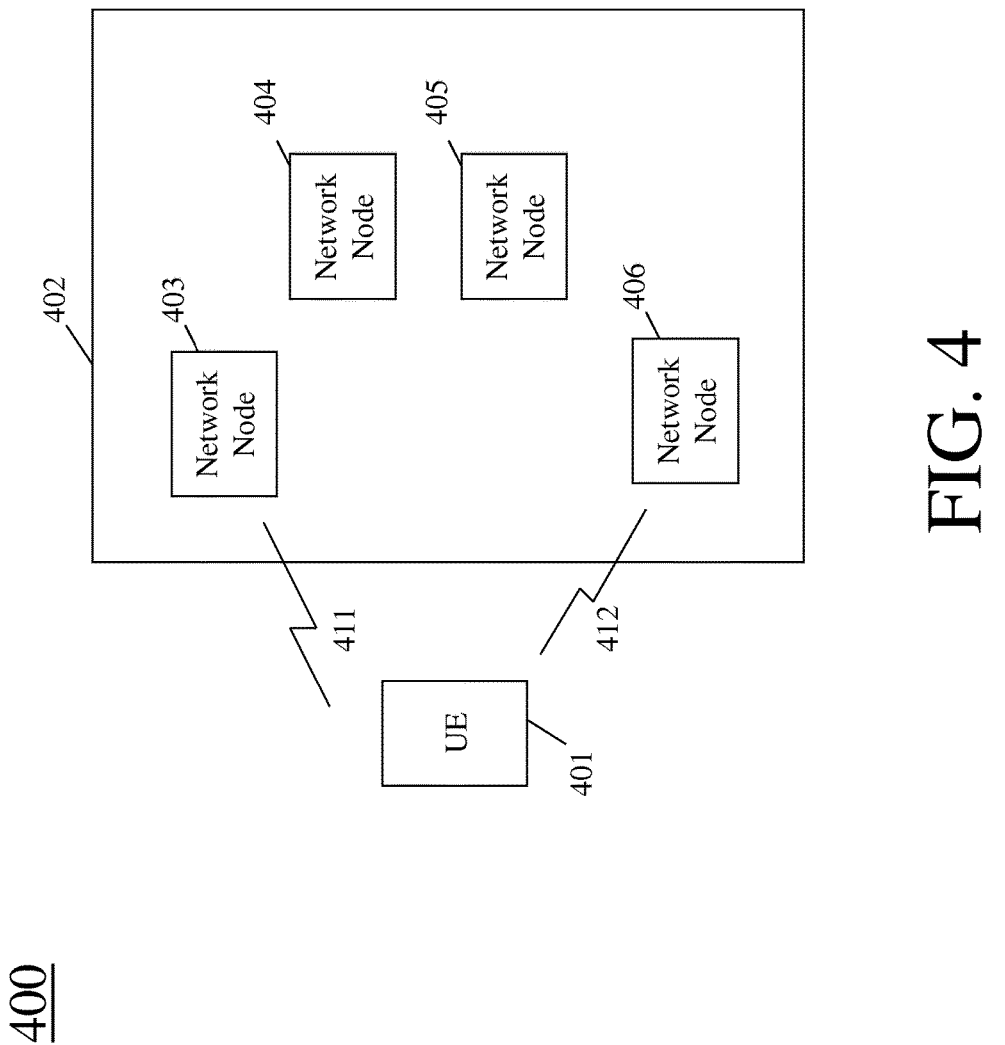
FIG. 4 is a block diagram depiction of a radio access network (RAN) and a user element (UE) in accordance with various embodiments of the present invention.

Having described certain embodiments in detail above, a review of the more general aspects common to many of the embodiments of the present invention can be understood with reference to FIG. 4. Diagram 400 of FIG. 4 is a block diagram depiction of a radio access network (RAN) 402 and a user element (UE) 401 in accordance with various embodiments of the present invention.

RAN 402 includes multiple network nodes 403-406. Those skilled in the art will recognize that the depiction of RAN 402 in FIG. 4 does not show all of the physical fixed network components necessary to operate commercially but only those system components and logical entities particularly relevant to the description of embodiments herein. For example, network nodes are known to comprise processing units, network interfaces, and wireless transceivers. In general, such components are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, network nodes 403 and 406, for example, represent known devices that have been adapted, in accordance with the description herein, to implement multiple embodiments of the present invention. Furthermore, those skilled in the art will recognize that aspects of the present invention may be implemented in and/or across various physical components and none are necessarily limited to single platform implementations. For example, the processing unit, wireless transceiver, and network interface of any of network nodes 403-406 may be implemented in or across one or more physical network platforms.

In the example, of diagram 400, RAN 402 includes network nodes 403 and 406 that are operative to transmit, via carriers 411 and 412, packet data to user element (UE) 401 using a protocol stack. The protocol stack includes a radio link control (RLC) layer split into an upper RLC processing layer and multiple lower RLC processing layers, such as is depicted in the protocol stack of FIG. 3. Each lower RLC processing layer is associated with one of the carriers (411 or 412) and each lower RLC processing layer supports packet data transmission via its associated carrier. The upper RLC processing layer supports packet data transmission via both carriers 411 and 412.

There are many embodiments in which RAN 402 is modified to various degrees. In some embodiments, network node 403 of the multiple network nodes is operative to host the upper RLC processing layer, while network nodes 403 and 406 are each operative to host a lower RLC processing layer. Depending on the embodiment, network nodes 403 and 406 may be geographically separated.

Being operative to host the upper RLC processing layer involves being operative to receive RLC service data units (SDUs), to generate protocol data units (PDUs) from the SDUs received, and to send PDUs to each of the lower RLC processing layers. Depending on the embodiment, being operative to host the upper RLC processing layer may also involve being operative to receive from at least one of the multiple lower RLC processing layers, an indication of a PDU size limit and may further involve being operative to generate PDUs with this PDU size limit.

Being operative to host a lower RLC processing layer of the multiple lower RLC processing layers involves being operative to receive PDUs from the upper RLC processing layer and to process the PDUs from the upper RLC processing layer as data to be retransmitted. This processing may involve being operative to segment the PDUs from the upper RLC processing layer to conform to a local current size limit at the lower RLC processing layer.

A person of skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as a magnetic disks or tapes, hard drives, or optically readable digital data storage media. The embodiments are also intended to cover computers programmed to perform said steps of methods described herein.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. Unless otherwise indicated herein, the use of relational terms, if any, such as first and second, top and bottom, and the like are used solely to distinguish one entity or action from another entity or action without necessarily requiring or implying any actual such relationship or order between such entities or actions.

The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

What is claimed is:

1. A method for improved multi-carrier communication, the method comprising:
    transmitting, by a radio access network (RAN) via multiple carriers, packet data to a user element (UE) using a protocol stack, the protocol stack including a radio link control (RLC) layer, the RLC layer being split into an upper RLC processing layer and multiple lower RLC processing layers, each of the multiple carriers being associated with the upper RLC processing layer and a lower RLC processing layer from among the multiple lower RLC processing layers;
    supporting, by the upper RLC processing layer, packet data transmission via the multiple carriers; and
    supporting, by each of the multiple lower RLC processing layers, packet data transmission via at least one of the multiple carriers, such that packet data transmission via each of the multiple carriers is supported by the upper RLC processing layer and a lower RLC processing layer from among the multiple lower RLC processing layers.

2. The method of claim 1, wherein the supporting, by the upper RLC processing layer, packet data transmission via the multiple carriers comprises:
    receiving, by the upper RLC processing layer, RLC service data units (SDUs);
    generating, by the upper RLC processing layer, protocol data units (PDUs) from the received SDUs;
    sending, by the upper RLC processing layer, the PDUs to each of the multiple lower RLC processing layers.

3. The method of claim 2, wherein the supporting, by the upper RLC processing layer, packet data transmission via the multiple carriers further comprises:
    receiving, by the upper RLC processing layer, an indication of a PDU size limit from at least one of the multiple lower RLC processing layers.

4. The method of claim 3, wherein the generating of the PDUs from the received SDUs comprises:
    generating, by the upper RLC processing layer, the PDUs with the PDU size limit.

5. The method of claim 1, wherein the supporting, by each of the multiple lower RLC processing layers, packet data transmission via at least one of the multiple carriers comprises:
    receiving, by each of the multiple lower RLC processing layers, protocol data units (PDUs) from the upper RLC processing layer;
    processing, by each of the multiple lower RLC processing layers, the received PDUs as data to be retransmitted.

6. The method of claim 5, wherein the processing, by each of the multiple lower RLC processing layers, the received PDUs as data to be retransmitted comprises:
    segmenting, by each of the multiple lower RLC processing layers, the received PDUs to conform to a local current size limit.

7. The method of claim 1, wherein the supporting, by each of the multiple lower RLC processing layers, packet data transmission via at least one of the multiple carriers comprises:
    performing, by each of the multiple lower RLC processing layers, RLC segmentation processing.

8. The method of claim 1, wherein
    the RAN includes multiple cells, and
    the multiple lower RLC processing layers include at least two different RLC processing layers, each of the at least two different RLC processing layers configured to operate on network equipment of different cells of the multiple cells.

9. The method of claim 8, wherein the different cells are geographically separated.

10. The method of claim 1, wherein the upper RLC processing layer and the multiple lower RLC processing layers are associated with a single radio bearer.

11. A non-transitory computer readable medium storing computer readable instructions, which when executed by at least one processor cause the at least one processor to perform the method of claim 1.

12. A radio access network (RAN) comprising:
    multiple network nodes configured to transmit, via multiple carriers, packet data to a user element (UE) using a protocol stack, the protocol stack including a radio link control (RLC) layer, the RLC layer being split into an upper RLC processing layer and multiple lower RLC processing layers, each of the multiple carriers being associated with the upper RLC processing layer and a lower RLC processing layer from among the multiple lower RLC processing layers, wherein
        the upper RLC processing layer is configured to support packet data transmission via the multiple carriers, and
        each of the multiple lower RLC processing layers is configured to support packet data transmission via at least one of the multiple carriers, such that packet data transmission via each of the multiple carriers is supported by the upper RLC processing layer and a lower RLC processing layer from among the multiple lower RLC processing layers.

13. The RAN of claim 12, wherein the multiple network nodes comprise:
    at least a first network node configured to host the upper RLC processing layer, the upper RLC processing layer configured to,
        receive RLC service data units (SDUs),
        generate protocol data units (PDUs) from the received SDUs, and
        send the PDUs to each of the multiple lower RLC processing layers.

14. The RAN of claim 13, wherein the upper RLC processing layer is further configured to,
    receive an indication of a PDU size limit from at least one of the multiple lower RLC processing layers.

15. The RAN of claim 14, wherein the upper RLC processing layer is further configured to,
    generate the PDUs with the PDU size limit.

16. The RAN of claim 12, wherein the multiple network nodes comprise:
   at least a first network node configured to host a lower RLC processing layer of the multiple lower RLC processing layers, the lower RLC processing layer configured to,
      receive protocol data units (PDUs) from the upper RLC processing layer, and
      process the received PDUs from the upper RLC processing layer as data to be retransmitted.

17. The RAN of claim 16, wherein the lower RLC processing layer is further configured to,
   segment the received PDUs to conform to a local current size limit.

18. The RAN of claim 12, wherein the multiple network nodes comprise:
   at least a first network node configured to host a lower RLC processing layer of the multiple lower RLC processing layers, the lower processing layer configured to,
   perform RLC segmentation processing.

19. The RAN of claim 12, wherein the multiple network nodes comprise:
   a first network node configured to host the upper RLC processing layer, and
   a second network node configured to host a lower RLC processing layer of the multiple lower RLC processing layers, the first network node being different from the second network node.

20. The RAN of claim 19, wherein the first network node and the second network node are geographically separated.

* * * * *